(12) United States Patent
Scott

(10) Patent No.: US 9,948,344 B1
(45) Date of Patent: Apr. 17, 2018

(54) DUAL MOBILE PHONE CARRYING SYSTEM AND METHOD OF USE

(71) Applicant: Toby James Scott, Haslet, TX (US)

(72) Inventor: Toby James Scott, Haslet, TX (US)

( * ) Notice: Subject to any disclaimer, the term of this patent is extended or adjusted under 35 U.S.C. 154(b) by 0 days.

(21) Appl. No.: 15/260,448

(22) Filed: Sep. 9, 2016

Related U.S. Application Data

(63) Continuation of application No. 62/216,423, filed on Sep. 10, 2015.

(51) Int. Cl.
*H04B 1/38* (2015.01)
*H04B 1/3888* (2015.01)
*A45F 5/02* (2006.01)

(52) U.S. Cl.
CPC .......... *H04B 1/3888* (2013.01); *A45F 5/021* (2013.01)

(58) Field of Classification Search
CPC .............................. H04B 1/3888; A45F 5/021
See application file for complete search history.

(56) References Cited

U.S. PATENT DOCUMENTS

2007/0045373 A1\* 3/2007 Stewart, Sr. ............ A45F 5/022
224/674

\* cited by examiner

*Primary Examiner* — Nguyen Vo
(74) *Attorney, Agent, or Firm* — Richard G. Eldredge; Eldredge Law Firm

(57) ABSTRACT

A dual mobile phone carrying system includes a pliable elongated body extending from a first end to a second end, the pliable elongated body having a front surface and an opposing back surface; an attachment device having a first fastener and a second fastener, both fixedly attached to the front surface of the pliable elongated body, a third fastener fixedly attached to an outer surface of a first mobile phone, and a fourth fastener fixedly attached to an outer surface of a second mobile phone; a locking device having a first device secured to the first end of the pliable elongated body, and a second device secured to the second end of the pliable elongated body; and a clip secured to back surface of the pliable elongated body, the clip is configured to removably secure to a pair of pants.

3 Claims, 4 Drawing Sheets

DUAL MOBILE PHONE CARRYING SYSTEM AND METHOD OF USE

BACKGROUND

1. Field of the Invention

The present invention relates generally to mobile phone carrying cases.

2. Description of Related Art

Mobile phone carrying cases are well known in the art and are effective means to carry a phone on a belt. For example, FIG. 1 depicts an oblique view of a mobile carrying case 101 having a body configured to removably receive a phone 105. During use, the case body 103 is secured to a belt 203 via a clip 107, as shown in FIG. 2.

Although effective in most applications, problems arise with case 101 when multiple phones are carried by a person. In FIG. 2, a second phone 205 is also carried by the user, in which the phone 205 is carried within the pocket 207 of the pants.

Accordingly, there is a long-felt need for a system and method that allows the user to carry two or more phones and to attach the phones to the belt of the user.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
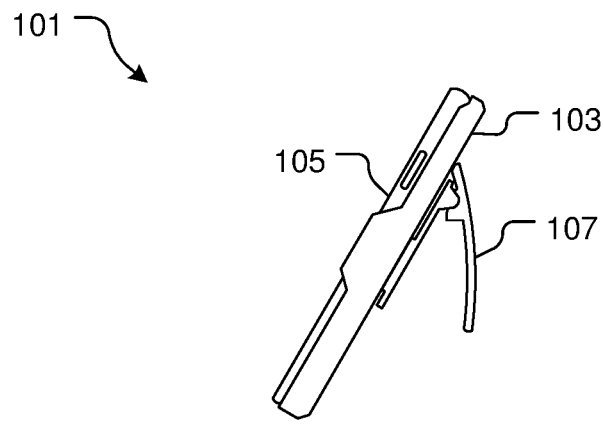
FIG. 1 is an oblique view of a conventional mobile phone carrying case.
Figure 2:
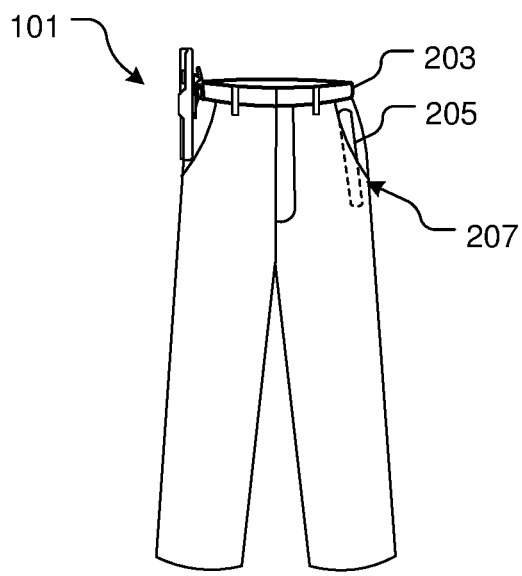
FIG. 2 is side view of the carrying case of FIG. 1 attached to a belt of the user.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional mobile phone carrying cases. Specifically, the system and method of the present application provides rapid and effective means to carrying two or more mobile phones, which in turn are secured to the belt of the user. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
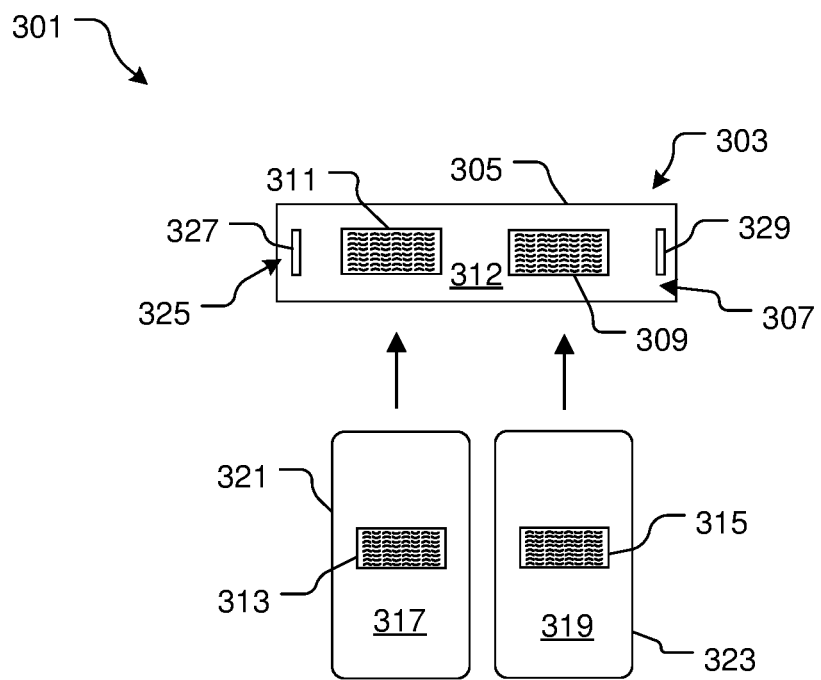
FIGS. 3 and 4 are front views of a dual mobile phone carrying system in accordance with a preferred embodiment of the present application.
Figure 4:
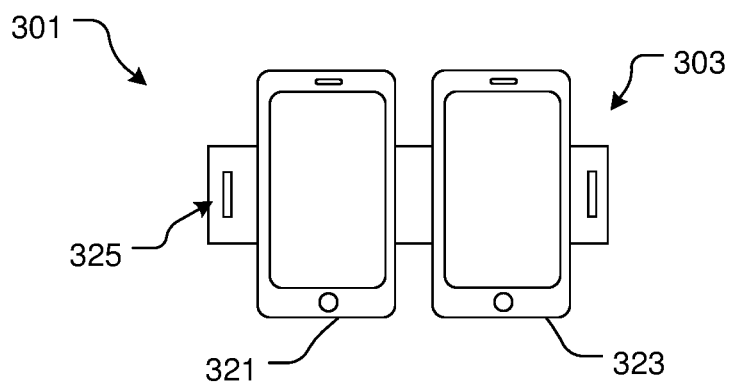

Referring now to the drawings wherein like reference characters identify corresponding or similar elements throughout the several views, FIG. 3 depicts a front view of a dual mobile phone carrying system 301 and method of use in accordance with a preferred embodiment of the present application. It will be appreciated that system 301 overcomes one of more of the above-listed problems commonly associated with the conventional carrying systems.

In the contemplated embodiment, system 201 includes one or more of a pliable strap 303 having an elongated body 305 with a phone attachment device 307 secured thereto. During use, the elongated body 305 is secured to the belt 203 and the phone attachment device 307 is configured to secure two or more phones 321, 323 to the strap 303.

Attachment device 307 includes a first fastener 309 configured to engage with a second fastener 315 secured to a surface 319 of phone 323 and a third fastener 311 configured to engage with a fourth fastener 313 secured to a surface 317 of phone 321. both fasteners 309, 311 are secured to a front surface 312 of the body 305.

In one contemplated embodiment, the fasteners 309, 311, 313, and 315 are hook-loop fasteners; however, it will be appreciated that alternative embodiments could include clips, snaps, magnets, adhesives, and other quick-release devices in lieu of the contemplated locking devices.

Figure 5:
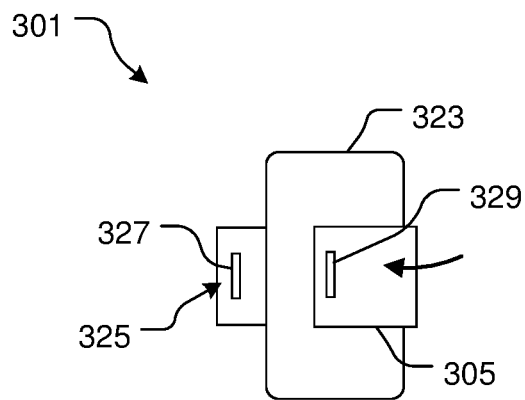
FIGS. 5 and 6 are front view of the carrying system of FIG. 3 in a folded position.
Figure 6:
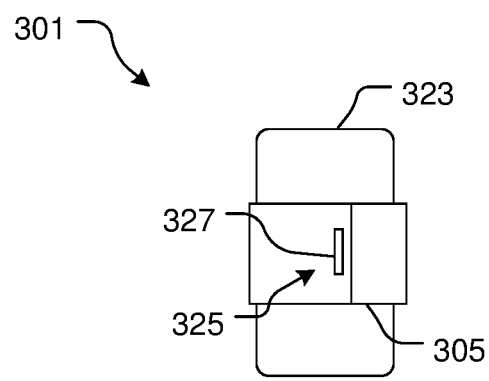
Figure 7:
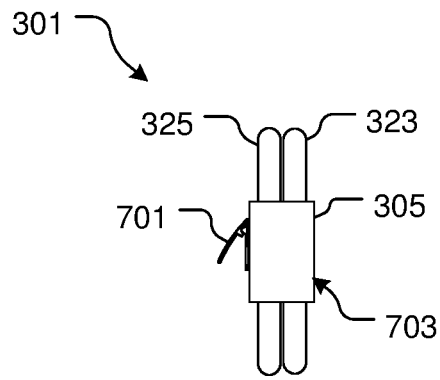
FIG. 7 is a side view of the carrying system of FIG. 3.

System 301 is further provided with a locking device 325 configured to secure the phones 321, 323 in a folded position, as shown in FIGS. 5-7. To achieve this feature, the locking device 325 includes a first device 327 at one end of body 305 and configured to engage with a second device 329 carried on the opposing end of the body 305. When folded, the two locking devices 327, 329 engage with each other.

In one contemplated embodiment, the locking devices 327, 329 could include a hook-loop fastener; however, it will be appreciated that alternative embodiments could include clips, snaps, magnets, adhesives, and other quick-release devices in lieu of the contemplated locking devices.

Figure 8:
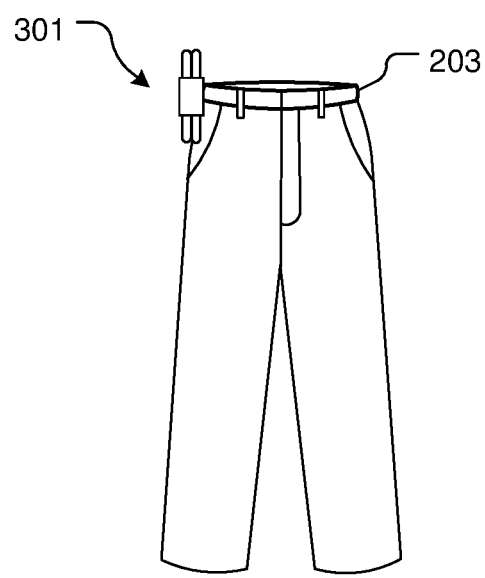
FIG. 8 is a side view of the carrying system of FIG. 3 attached to a belt.

One of the unique features believed characteristic of the present application is the ability to removably secure the phone to a single strap, which in turn can be secured to the belt of the pants. This feature is shown in FIG. 8, wherein a clip 701 secured to a surface 703 of the body is used to fasten the system to the pants (see, e.g., FIG. 7). In alternative embodiments, a clip 701 could be replaced with other types of fastening devices having the same characteristics.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dual mobile phone carrying system, comprising:
   a pliable elongated body extending from a first end to a second end, the pliable elongated body having a front surface and an opposing back surface;
   an attachment device, having:
   a first fastener and a second fastener, both fixedly attached to the front surface of the pliable elongated body;
   a third fastener fixedly attached to an outer surface of a first mobile phone; and
   a fourth fastener fixedly attached to an outer surface of a second mobile phone;
   wherein the third fastener is configured to removably attach to the first fastener; and
   wherein the fourth fastener is configured to removably attach to the second fastener;
   a locking device, having:
   a first device secured to the first end of the pliable elongated body; and
   a second device secured to the second end of the pliable elongated body;
   wherein the first device is configured to removably secured to the second device; and
   a clip secured to back surface of the pliable elongated body, the clip is configured to removably secure to a pair of pants;
   wherein the pliable elongated body is configured to secure to back surfaces of both the first mobile phone and the second mobile via the attachment device such that front surfaces of both the first mobile phone and the second mobile phone come into contact with each other; and
   wherein the locking device is configured to secure the pliable elongated body in a wrapped position around the first mobile phone and the second mobile phone.

2. The system of claim 1, wherein the first fastener and the second fastener are hook-loop fasteners.

3. The system of claim 1, wherein the first device and the second device of the locking device are magnets.

* * * * *